United States Patent

Shernoff et al.

[11] 3,860,311
[45] Jan. 14, 1975

[54] APPARATUS FOR PRODUCING MAGNETIC RESONANCE CELLS

[75] Inventors: Donald I. Shernoff, White Plains; James H. Simpson, Katonah, both of N.Y.

[73] Assignee: The United States of America as represented by the Secretary of the Navy, Washington, D.C.

[22] Filed: July 23, 1973

[21] Appl. No.: 381,834

[52] U.S. Cl. .................................. 316/30, 316/12
[51] Int. Cl. ............................................. H01j 9/38
[58] Field of Search .............. 316/3, 12, 27, 30, 31; 65/60, 34; 324/.5 F, .5 E; 331/94, 94.5

[56] References Cited
UNITED STATES PATENTS

| 1,623,323 | 4/1927 | Van Voorhis | 316/3 |
| 1,904,895 | 4/1933 | Campbell | 316/5 |
| 3,721,541 | 3/1973 | Simpson et al. | 65/60 |

OTHER PUBLICATIONS

D. J. Clack et al., The Manufacture of alkali vapor cells for optical experiments, J. Phys. E., Vol. LL, No. 10, Oct. 1971, pages 758–760.

Primary Examiner—Roy Lake
Assistant Examiner—James W. Davie
Attorney, Agent, or Firm—R. S. Sciascia; P. Schneider; R. Rothman

[57] ABSTRACT

A method and apparatus for making a magnetic resonance cell. Two elongated tubes communicate through orifices with the cell which is surrounded by an oven. One tube contains an ampoule prefilled with a barium film. The other tube has a necked-down portion or seal-off region and an enlarged portion. The enlarged portion has two branches, the first axially aligned with the necked-down portion and the second disposed at an acute angle with respect to the first. A wax carrier is in the first branch and an ampoule containing cesium is in the second. Vacuum pumps evacuate the cell and tubes, after which evacuation the cell is heated. Moving the wax carrier into the necked-down portion of the tube allows the wax to evaporate into the resonance chamber of the cell. After removing the wax carrier from the necked-down portion, one positions the cesium-filled ampoule in the necked-down portion. The necked-down portion is then heated and sealed to remove the cell and ampoules from the vacuum system. Breaking the ampoules allows the barium to act as a getter and the cesium to escape. The cesium-filled ampoule and necked-down portion may be removed by heating and sealing the necked-down portion at its point of connection to the cell.

6 Claims, 4 Drawing Figures

APPARATUS FOR PRODUCING MAGNETIC RESONANCE CELLS

BACKGROUND OF THE INVENTION

This invention relates generally to magnetometers and more specifically to a method and apparatus for producing a magnetic resonance cell which one can employ in a magnetometer as well as various other devices.

Previous methods for fabricating magnetic resonance cells involved the use of an inert buffer gas to reduce interaction of the alkali metal atoms with the glass walls of the cell. Often a thin coating of a wax-like material was employed to form a lining on the inner surface of the glass envelope of the cell to eliminate the interaction between the alkali-metal vapor and the glass. Old methods for applying such a coating are described in the literature regarding the fabrication of rubidium, magnetic resonance cells.

The disadvantages of the old methods primarily concern maintaining the purity of the cell. Coating the inner surface of the cell with wax often involved direct heating of the wax. Over-heating of the wax was a common occurrence which resulted in cracking it to produce organic contamination of the cell. Furthermore, difficulty was encountered in removing wax from parts of the manufacturing apparatus. Removal of the wax was necessary to avoid the possibility of it coming into contact with hot cesium vapor and producing unwanted compounds. Finally a sealed-off cell requires the presence of a gettering agent to maintain the existence of a high vacuum. Conventional methods use a barium getter ring — barium in a nickel tube — which is flashed to release the barium that acts as the gettering agent. However, the presence of nickel, being a magnetic substance, hinders the performance of the cell.

SUMMARY OF THE INVENTION

The present invention provides a method of fabricating an alkali-metal, magnetic resonance cell with high signal strength, minimum interactions between the walls of the cell and the enclosed alkali-metal vapor, minimum sensitivity of resonance-line width to magnetic-field gradients, and stability of performance over an extended period of time. To coat the inside surface of the cell with wax, one moves the wax into direct and immediate communication with the cell interior, eliminating the possibility of contamination of other parts of the apparatus and the necessity for flaming various parts of the apparatus to remove unwanted wax. The alkali metal can also be moved into direct and immediate communication with the cell, eliminating the necessity of heating and, therefore, reducing the possibility of the metal reacting with the wax. A film of gettering agent is employed rather than a gettering ring, also reducing the likelihood of contamination.

An object of the present invention is to produce a magnetic-resonance cell which is free of impurities.

Another object is to produce a magnetic resonance cell having a high signal strength with minimum sensitivity of resonance-line width to magnetic-field gradients.

Still another object is to provide a cell which is stable over extended periods of time and which has a minimum of interactions between the walls of the cell and the enclosed alkali-metal vapor.

Other objects, advantages, and novel features of the present invention will become apparent from the following detailed description of the invention when considered in conjunction with the accompanying drawings.

DESCRIPTION OF THE PREFERRED EMBODIMENTS

Figure 4:
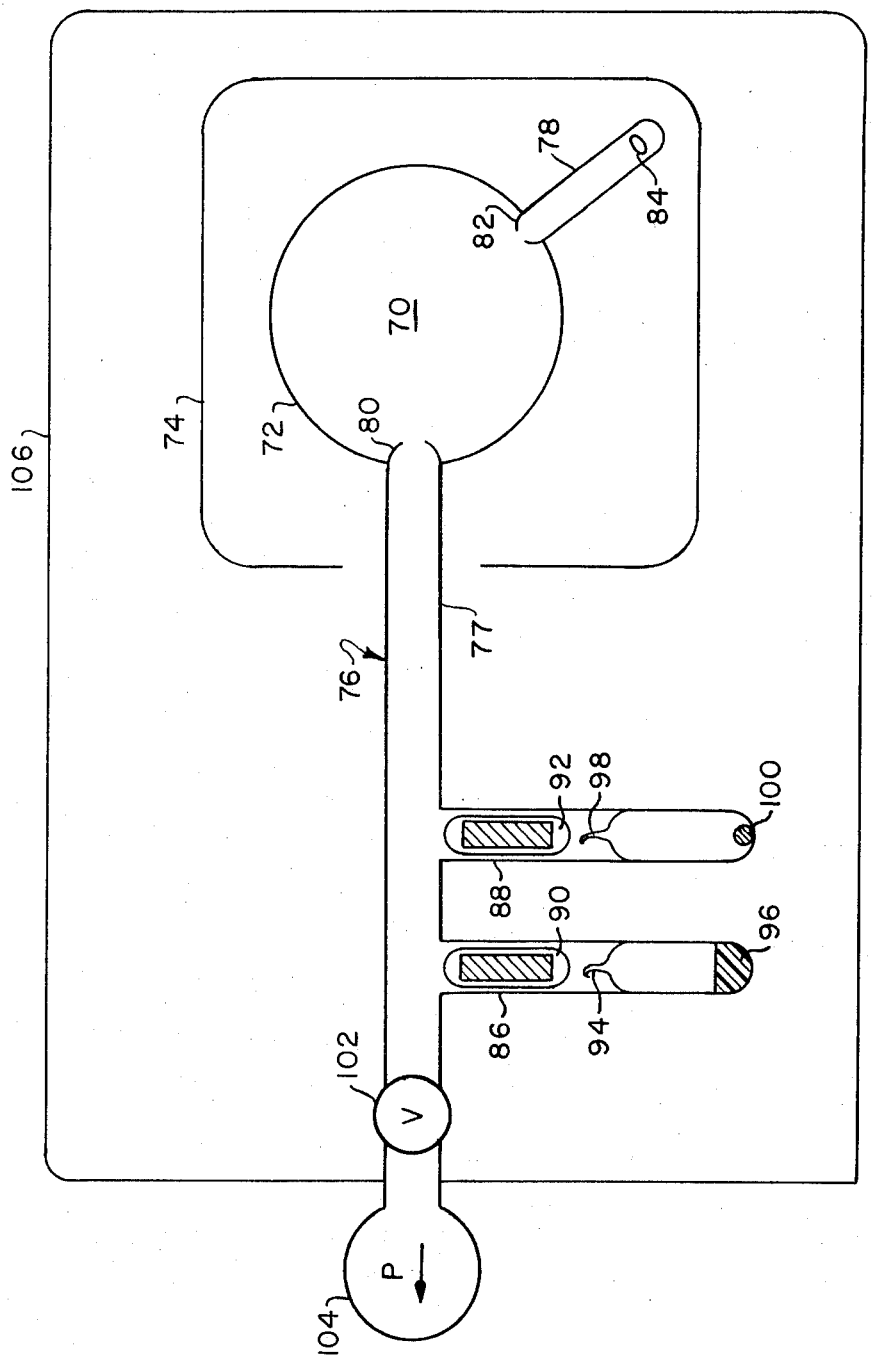
FIG. 4 is a schematic of a prior art device employed to make a magnetic resonance cell.

To gain a better understanding of the present invention, one must first understand the typical procedures employed in the past to produce a magnetic resonance cell containing an alkali-metal vapor. FIG. 4 illustrates such a prior art device.

A glass sphere 72 forms what eventually will become the resonance chamber 70. The sphere 72 is surrounded by a first oven 74. Two elongated tubes 76 and 78 communicate with the resonance chamber through orifices 80 and 82. Tube 78 contains a gettering agent, in this case a barium getter ring 84. Tube 76 has two branches 86 and 88 which are perpendicular to the central axis of tube 76. The tubes 86 and 88 contain magnets 90 and 92 enclosed in glass. These enclosed magnets are held in place by magnets (not shown) outside of the tubular extensions or branches 86 and 88. The bottom of each tubular extension 86 and 88 is sealed by a thin layer of glass having frangible tips 94 and 98. In the chamber formed in the bottom of tube 86 a wax-like material 96 is placed. In the chamber formed in the base of tubular extension 88 an alkali-metal pellet 100 is placed. A valve 102 controls communication between a vacuum pumping system 104 and the tubular extension 76. A larger oven 106 encloses the smaller oven 24 and the tubular extension 76.

The technique employed to produce the cell would typically include the following steps. A vacuum would be obtained in the apparatus by means of the pump system 104. Sphere 72 would then be heated to about 400°C by means of oven 74 for several hours. Valve 102 would then be closed and frangible tip 94 broken using the enclosed magnet 90 directed by a magnet (not shown) outside branch 86. Oven 74 would be turned off and oven 106 turned on to drive the wax 96 into the resonance chamber 70. After wax 96 has evaporated oven 14 is turned off and the tubulation between the orifice 80 and the frangible tip 94 would be gently flamed to remove any wax from the tubulation. Overheating of the wax during this step often occurs cracking the wax to produce organic contamination of the cell. Furthermore, it is also difficult to ensure the complete removal of the wax from the tubulation to avoid contamination with the alkali metal that is introduced in the next step. After the tubulation has been flamed, flangible tip 98 is broken using the enclosed magnet 92. A hand torch is then used to evaporate the alkali metal until a sufficient amount appears in the region between the small orifice 80 and the seal-off region 77. The seal-off region 77 is then heated to soften the glass, allow a seal to form, and remove the cell from the vacuum system. Finally, the barium getter ring 84 is flashed. As noted above this step often results in contamination of the cell.

Figure 1:
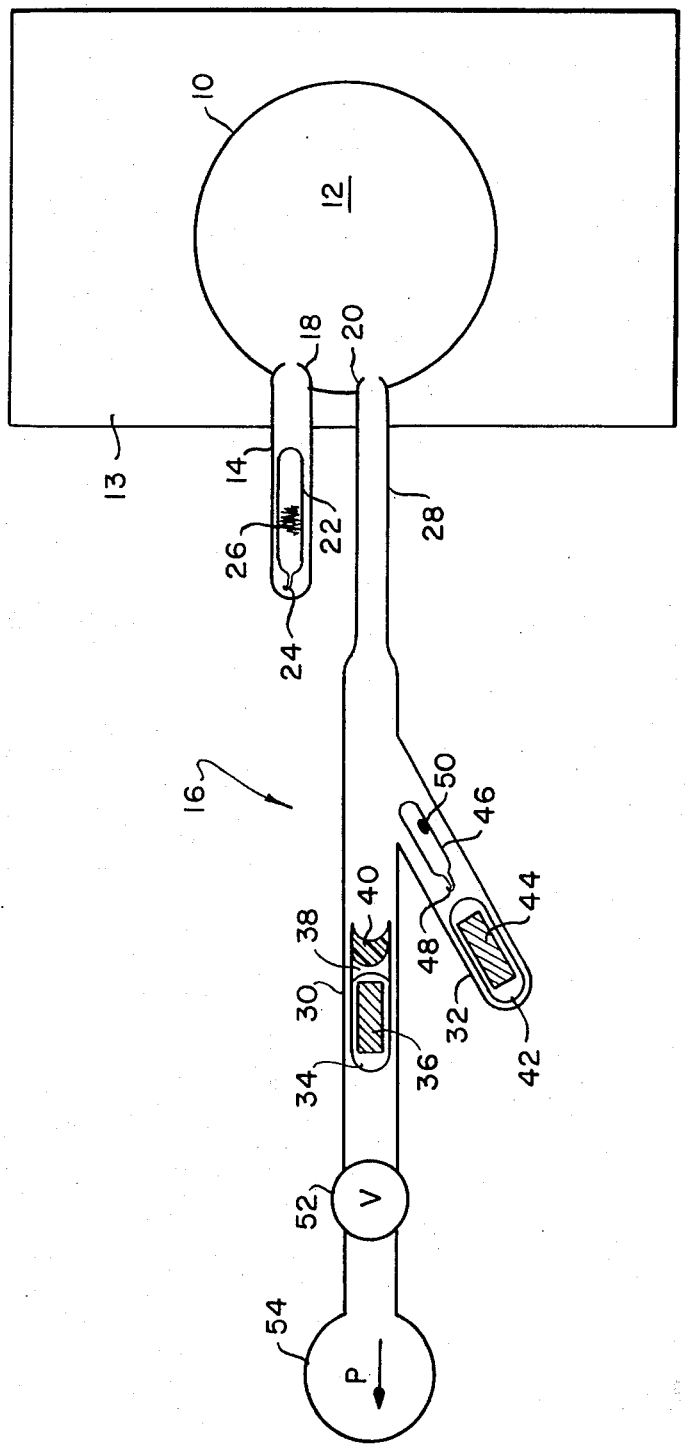
FIG. 1 is a schematic diagram of the apparatus employed to produce the magnetic-resonance cell of the present invention.

The present invention overcomes these deficiencies by employing the apparatus depicted in FIG. 1. A glass sphere 10 encloses what eventually will become the resonance chamber 12 of the completed cell. Two elongated tubes 14 and 16 communicate with the cell through orifices 18 and 20. Only one oven 13 is employed in the present invention to heat the sphere 10. Tube 14 contains a glass ampoule 22 which has a frangible tip 24. The ampoule 22 has been prefilled with a gettering film 26, preferably barium. The other tube 16 has a necked-down portion or seal-off region 28 and an enlarged portion having two branches 30 and 32. The first branch 30 is actually in line with the necked-down portion 28, and the second branch 32 is disposed at an acute angle with respect to the first. A wax carrier 34 is in the first branch 30. The wax carrier 34 is composed of a glass-enclosed magnet 36 which is moved by means of a magnet (not shown) outside the tubular extension. One end 38 of the wax carrier 34 is hollowed out and contains a wax 40. The second branch 32 also contains a glass-enclosed magnet 44 similar to the one employed in branch 30. Above the glass-enclosed magnet 44 is an ampoule 46 having a frangible tip 48 which encloses an alkali metal 50. At the end of the tubular extension 16 is a valve 52 which controls the connection to a vacuum pumping system 54.

Of course, both of the ampoules 22 and 46 must be prepared prior to forming the apparatus, which can be constructed using standard glass blowing and handling techniques. The gettering film 26 and ampoule 22 are produced by flashing a commercial gettering ring inside the ampoule 22 under high vacuum. The metal ring is then removed from the ampoule 22, and it is sealed off at the frangible tip 24. Although barium is most extensively used as a getter material, magnesium, calcium, sodium and phosphorus may also be employed. Although any alkali metal may be placed in ampoule 46, cesium is preferred. The wax 40 may be purchased in a highly purified form or purified by vacuum distillation prior to being placed in the wax carrier 34. Both hexatriacontane and octacosane have been employed as a wax. In addition, the two may also be mixed. Other long-chain hydrocarbon, wax-like substances may also be employed.

Figure 2:
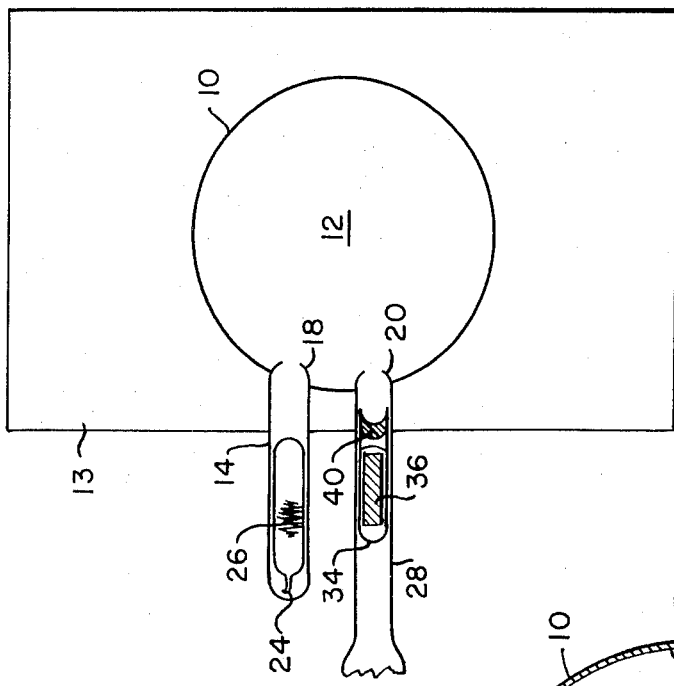
FIG. 2 is a schematic of a portion of the apparatus shown in FIG. 1 depicting the position of the elements during an initial step of the method.
Figure 3:
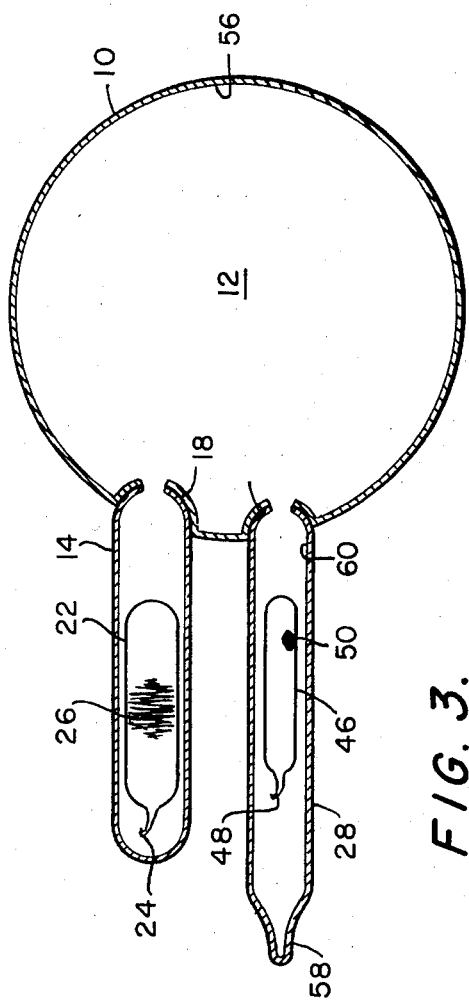
FIG. 3 is a schematic of the magnetic resonance cell during the final step just prior to completion.

To form the cell a vacuum is first obtained in the apparatus by means of the pump system 54. Sphere 10 is then heated to about 400°C by means of the oven 13 for several hours. Sphere 10, like other glass parts of the apparatus, is preferably Pyrex. The oven is then turned off, and the wax carrier 34 is moved by means of a magnet (not shown) outside the branch 30 into the seal-off region 28 as shown in FIG. 2. The temperature inside the oven 13 is then raised to about 200°C, depending on the specific wax being used, to drive the wax into the resonance chamber 12. Because the wax carrier 34 is directly and immediately adjacent to the resonance chamber 12, contamination of other parts of the apparatus with the wax is avoided. Next the oven is turned off, and the cell and tubular extensions are removed from the oven. If desired the seal-off region 28 may be gently flamed at this time. By means of the enclosed magnet 42 the ampoule 46 is moved into the seal-off region 28 just vacated by the wax carrier 34. Next the seal-off region 28 is heated at 58 with a hand torch to seal the region and remove the rest of the tubular extension arriving at the structure shown in FIG. 3. Simply shaking the cell breaks the frangible tips 24 and 48. Breaking frangible tip 48 allows the alkali metal 50 in the ampoule 46 to evaporate into the cell. The barium film 26 in the ampoule 22, now exposed, can perform its gettering function. If desired, the necked-down portion 28 can be removed and sealed off at 60 by use of a torch.

Obviously many modifications and variations of the present invention are possible in light of the above teachings. It is therefore to be understood that, within the scope of the appended claims, the invention may be practiced otherwise than as specifically described.

What is claimed is:

1. An apparatus for making a magnetic resonance cell comprising:
   a glass sphere;
   at least two tubes connected to said sphere;
   a necked-down portion in one of said tubes connected at one of its ends to said sphere;
   two tubular branches connected to the other end of said necked-down portion;
   vacuum pumping means connected to the otherwise unconnected end of the first of said branches, the second being sealed at its unconnected end;
   first carrier means movably contained within the first of said branches for carrying a wax-like material into said necked-down portion, said first carrier means holding a portion of wax-like material;
   second carrier means movably contained within the second of said branches for moving an alkali metal into said necked-down portion, said second carrier means holding a portion of alkali metal; and
   a getter within said second tube.

2. The apparatus of claim 1 wherein said first carrier means comprises a first glass-enclosed magnet having a hollowed out portion in one of its ends for holding a wax-like material.

3. The apparatus of claim 2 wherein said second carrier means comprises a second glass-enclosed magnet and an ampoule between the second glass-enclosed magnet and the necked-down portion, said ampoule having a frangible tip.

4. The apparatus of claim 3 wherein a second ampoule having a frangible tip is within said second tube and said getter is a film on the inside of said second ampoule.

5. The apparatus of claim 1 wherein said second carrier means comprises a glass-enclosed magnet and an ampoule having a frangible tip thereon between said glass enclosed magnet and said necked-down portion.

6. The apparatus of claim 1 wherein an ampoule having a frangible tip is within said second tube and said getter is a film on the inside of said ampoule.

* * * * *